(12) United States Patent
Müller (10) Patent No.: US 7,048,305 B2
(45) Date of Patent: May 23, 2006

(54) SAFETY STEERING AND MECHANISM AND A METHOD OF OPERATING

(75) Inventor: Olaf Müller, Rüsselsheim (DE)

(73) Assignee: Thyssenkrupp Presta AG (DE)

( * ) Notice: Subject to any disclaimer, the term of this patent is extended or adjusted under 35 U.S.C. 154(b) by 239 days.

(21) Appl. No.: 10/431,329

(22) Filed: May 7, 2003

(65) Prior Publication Data

US 2004/0041388 A1    Mar. 4, 2004

(30) Foreign Application Priority Data

May 7, 2002    (DE) ............................ 202 07 190 U (51) Int. Cl.
*B62D 1/18* (2006.01)
(52) U.S. Cl. .................... 280/775; 280/777; 74/493
(58) Field of Classification Search ................ 280/775, 280/777; 74/493, 494
See application file for complete search history.

(56) References Cited

U.S. PATENT DOCUMENTS

| | | | | |
|---|---|---|---|---|
| 4,656,888 A | * | 4/1987 | Schmitz ........................ | 74/493 |
| 5,071,163 A | * | 12/1991 | Heinrichs et al. ............ | 280/775 |
| 5,477,744 A | * | 12/1995 | Hoblingre et al. ............ | 74/493 |
| 5,485,376 A | * | 1/1996 | Oike et al. ..................... | 701/41 |
| 5,520,416 A | * | 5/1996 | Singer et al. ................ | 280/775 |
| 5,634,662 A | * | 6/1997 | Asayama ...................... | 280/777 |
| 5,820,163 A | * | 10/1998 | Thacker et al. .............. | 280/775 |
| 6,142,523 A | * | 11/2000 | Bathis et al. ................ | 280/777 |
| 6,354,626 B1 | * | 3/2002 | Cartwright ................... | 280/777 |
| 6,585,294 B1 | * | 7/2003 | Faulstroh et al. ............ | 280/777 |
| 6,711,965 B1 | * | 3/2004 | Tomaru et al. ................ | 74/493 |

* cited by examiner

*Primary Examiner*—David R. Dunn
(74) *Attorney, Agent, or Firm*—Fleit Kain Gibbons Gutman Bongini & Bianco; Martin Fleit; Paul D. Bianco (57) ABSTRACT

A safety steering mechanism for a steering column, with a steering-column comfort adjustment having linear positioning devices, and provided with safety devices designed such that, in an accident situation, at least an end area of the steering column can be moved away from a driver's position. The linear positioning devices include load absorption devices and/or withdrawal devices regarding the movement of at least the end area of the steering column away from a driver's position. An operating method for a safety steering mechanism for a steering column that can be adjusted by a comfort adjustment in accordance with the requirements and/or wishes of a driver by means of linear positioning devices and of which at least an end area of the steering column can be moved away from a driver's position in an accident situation. The movement of at least the end or the steering column away from a driver's position is braked in an accident situation in a load-receiving manner by load absorption devices contained in the linear positioning devices.

13 Claims, 6 Drawing Sheets

SAFETY STEERING AND MECHANISM AND A METHOD OF OPERATING

BACKGROUND OF THE INVENTION

1. Field of the Invention

The invention relates to a safety steering mechanism and a method of operating

The invention has embodiments and can be used in combination with steering mechanisms in accordance with international patent applications PCT/DE 99/01000, PCT/DE 01/00746, PCT/DE 01/00737, PCT/DE 00/01889 and PCT/DE 00/02286. In order to avoid mere repetitions, the disclosures of all these applications are completely included and incorporated herewith and herein by reference.

2. Prior Art

Numerous safety steering columns and operating methods for them are known for better protecting vehicle drivers in accidents. In this connection, safety steering mechanisms have become known in practice with a steering column, a steering-column comfort adjustment comprising linear positioning devices, and with safety devices designed such that in an accident situation at least an end area of the steering column can be moved away from a driver's position.

The task in this technical area is to protect people from injuries and, in particular, also from lethal consequences in accidents. Therefore, even the present invention has the basic objective of further improving safety steering columns and methods of operating them in order to even better protect people and, in particular, the drivers present in motor vehicles.

SUMMARY OF THE INVENTION

This objective is achieved by a safety steering mechanism with a steering column, a steering-column comfort adjustment comprising linear positioning devices, and with safety devices designed such that in an accident situation at least an end area of the steering column can be moved away from a driver's position, in which the linear positioning devices comprise load absorption devices and/or withdrawal devices regarding the movement of at least the end area of the steering column away from a driver's position.

Furthermore, the indicated objective is achieved with an operating method for a safety steering mechanism with a steering column that can be adjusted by a comfort adjustment in accordance with the requirements and/or wishes of a driver by means of linear positioning devices and from which at least an end area of the steering column can be moved away from a driver's position in an accident situation. The movement of at least the end of the steering column away from a driver's position is braked in an accident situation in a load-receiving manner by load absorption devices and/or is brought about by withdrawal devices contained in the linear positioning devices or arranged immediately following them.

The invention creates a safety steering mechanism and an operating method for it that further increase the safety for vehicle drivers. The installation space for the linear positioning devices of the comfort adjustment in the direction of the central axis of the steering column is utilized in an especially advantageous manner for load absorption devices and/or withdrawal devices. This results in a very compact construction that on the one hand saves space and weight and therewith expense and on the other hand allows more room for the driver, whose risk of injury is further reduced therewith.

A refinement of the invention advantageously provides that the linear positioning devices in the safety steering mechanism of the invention comprise a spindle drive or a rack-and-pinion drive and that the load absorption devices and/or withdrawal devices are integrated into a corresponding threaded spindle or a rack-and-pinion or directly follow the same.

Another preferred embodiment provides that the load absorption devices comprise at least one unit with a cylinder and a piston that can move in the cylinder such that, in an accident, at least an end area of the steering column can be moved away from a driver's position and that resistance devices for load absorption are provided in the movement path of the piston and are in particular, adjustable. It can furthermore be provided in particular that the resistance devices comprise at least one compressible corrugated tube, paring knives that can be activated in a controlled manner and preferably pyrotechnically or electromagnetically, and/or comprise a preferably controllable nozzle or valve arrangement for appropriately and optionally controllably throttling a flow of fluid.

Another preferred embodiment of the present invention consists in that the withdrawal devices comprise at least a unit with a cylinder and a piston that is preferably pyrotechnically driven and can move in the cylinder such that in an accident situation at least one end area of the steering column can be moved away from a driver's position. It can also be particularly provided in this instance that the withdrawal devices are designed to move at least the end area of the steering column away from a driver's position in a preferably controllable manner as regards the start, speed and/or displacement path length at the start of, during and/or after an accident, the withdrawal devices furthermore being preferably designed to set a maximum withdrawal at least of the end area of the steering column away from the driver's position a given time after the start of the accident independently of preceding withdrawal movements and load absorptions.

Appropriate embodiments can be further refined in that the piston and the cylinder are connected to one another by a circumferential toothing or splines and are adapted to rotate in unison with respect to the longitudinal axis of the cylinder. Alternatively or additionally, it can be provided in such designs that the piston is fixed in the cylinder such that it cannot slide and that they rotate in unison with respect to the longitudinal axis of the cylinder by tear-off rivets in any case until the occurrence of an accident.

It is furthermore preferred that the load absorption devices and/or the withdrawal devices can be adjusted and/or altered at the start of and/or in an accident situation as a function of the passengers.

Yet another preferred embodiment of the invention consists in designing the linear positioning devices to make an adjustment of at least the end area of the steering column possible along its central axis and also transversely to it in at least substantially vertical directions. Furthermore, it is also provided in particular that the linear positioning devices comprise a longitudinal adjustment drive with a longitudinal adjustment spindle drive or rack-and-pinion drive and a vertical adjustment drive with a vertical adjustment spindle drive or a rack-and-pinion drive. Furthermore, it can be preferably provided that the linear positioning devices comprise a common drive motor for the longitudinal adjustment drive and for the vertical adjustment drive that can be coupled alternatively to the drive motor via coupling devices, which are preferably designed to shift back and forth between the longitudinal and the vertical adjustment drives or to concretely engage or cut out the longitudinal or the vertical adjustment drive individually. It can furthermore be advantageous that the longitudinal adjustment drive, in particular its longitudinal adjustment spindle drive or rack-and-pinion drive, and the vertical adjustment drive, in particular its vertical adjustment spindle drive or rack-and-pinion drive, are arranged serially along a common axis and that the coupling devices are preferably optionally arranged between the longitudinal and the vertical adjustment drives in order to make possible a selective coupling of the drive motor to the longitudinal or the vertical adjustment drive. Moreover, another design possibility resides in the fact that the vertical adjustment drive comprises a lever arrangement, especially an articulated lever or link_arrangement or scissors arrangement that is coupled in such a manner on the one hand to the vertical adjustment spindle drive or vertical adjustment rack-and-pinion drive and on the other hand to a stationary bearing in the vehicle that the lever arrangement brings about a vertical movement of the steering column in the vehicle when the vertical adjustment drive is actuated by pivoting about the stationary bearing.

Other advantageous and preferred embodiments of the invention result from the dependent claims and their combinations as well as from the data in the present specification concerning concrete embodiments as well as general basic measures.

The present invention creates in concept and especially in concrete embodiments simplified steering mechanisms that can be adjusted in a crash to absorb a load or be displaced electrically. The present invention makes use of various aspects that advantageously result in any combination in substantial improvements to the safety of vehicle drivers but which can also be viewed and are worthy of protection individually as a separate invention, and in particular, even independently of the other aspects of the present invention.

1. Load absorption in a crash in the adjustment drive of the comfort adjustment:

The impact load on the steering mechanism in a crash is usually absorbed in steering mechanisms currently known in practice by a carriage that deforms a metal sheet, dissipating energy. The invention creates cost savings here and greater safety in that, in order to simplify the absorption of load, the latter is displaced, e.g., into the drive spindle of the linear positioning devices. The integration of the absorption of load into the drive spindle further substantially simplifies the design, especially of an electrically adjustable steering mechanism with load absorption. Other embodiment measures of this aspect of the present invention are:

The steering column of the safety steering mechanism is designed such that the adjustment members can be deformed, in particular in a precisely given manner.

An adjustment member is comprised that is designed as a spindle that is formed in parts by a deformable corrugated tube.

An adjustment member is comprised in which a camshaft of the longitudinal adjustment of the steering column is designed with a piston-cylinder unit whose piston must push a liquid or a fluid through a valve in the manner of a shock absorber in an accident situation. For rather high speeds or a severe accident collision, the flow resistance of the liquid through the valve naturally increases.

In order that the piston entrains the cylinder during rotation, a positive connection, e.g., by means of toothing or splines, is provided with particular preference for these two elements.

An adjustment member is comprised in which a camshaft of the longitudinal adjustment of the steering column is designed with a piston-cylinder unit whose piston must push a liquid or a fluid through a valve in the manner of a shock absorber in an accident situation. For a better adaptation of the damping or of the load absorption thus achieved to the circumstances of an accident and of the passenger parameters, the flow cross-section of the valve can be altered, e.g., by a needle that is conical in diameter and is movably arranged in the flow opening of this valve. In this manner, the resistance of the flow valve for optimized damping or load absorption is utilized or taken into consideration not only as a function of the speed, making use of the liquid properties or fluid properties, but also by the needle that can be regulated in particular as a function of passenger parameters. In order that the piston entrains the cylinder during rotation, a positive connection, e.g., by means of teeth, is again provided with particular preference for these two elements.

The valve of the present variation is controlled electrically or electromagnetically like a servovalve so that a load absorption or a damping adapted to a concretely given serious accident and/or to existing passenger parameters can be provided by appropriately adjusting the flowthrough of the valve.

2. Switchable load absorption between, e.g., two constant magnitudes and/or prior movement of the steering mechanism in the case of small persons and/or in a second crash phase:

Steering mechanisms currently known in practice customarily have only one load absorption magnitude that corresponds to the design of a deformation metal sheet. In contrast thereto, the invention results in a distinctly elevated safety. An embodiment variant of the invention that creates a solution in this regard consists in a variation of the load absorption on, e.g., two levels and in a reduction for a small person and in the second crash phase when the front wall of the vehicle and therewith the steering mechanism penetrate into the interior of the vehicle. An "intelligent" switchable load absorption and movement in a compact piston allows, e.g., three load absorption levels as a function of the crash in an especially simple and economical manner and, in addition, the movement of the steering mechanism out of the way for small persons and in the second crash phase.

Examples of other measures of this aspect of the present invention are:

The steering column of the safety steering mechanism is designed such that its load absorption can be adjusted for the passengers as a function of the parameters of the passenger during the course of an accident situation.

The steering column of the safety steering mechanism is designed such that its position can be changed during the course of an accident situation.

The steering column of the safety steering mechanism is designed such that it is moved away to a maximum extent from the driver and/or compressed in the final phase of an accident, in order to create as much survival space as possible, and has the additional advantage that additional space is created for rescue measures.

The steering column of the safety steering mechanism is designed such that an adjustment shaft of its preferably electrically-operated comfort adjustment is provided with a load absorption- and position-optimizing mechanism or, more generally expressed, with corresponding devices. In particular, such a load absorption- and position-optimizing mechanism is located in a sliding central hub of the steering column.

The safety steering mechanism is associated with detection and control devices preferably with electric or electronic data acquisition, data transfer and data processing, in order to be able to purposefully control the operation of load absorption devices and/or withdrawal devices as a function of accident circumstances and/or of passenger parameters.

Such detection and control devices can be designed to recognize and process positional and weight data or any other passenger parameters such as, e.g., belted status. The consequence, e.g., of identifying a small person is that, e.g., no load absorption takes place in an accident but there is a withdrawal of at least the end area of the steering column away from a driver's position, or, in other words, towards the front in the vehicle.

The load absorption devices comprise knives or paring knives that pare a chip out of the cylinder, or, more exactly, out of its tube wall through which or along which they are pushed while dissipating load. The thickness of the chip to be pared out is preferably precisely given by a stop and an appropriate design of the paring knife. Another preferred embodiment consists in using individual or groups of such paring knives that are controlled in a purposeful manner or are kept inoperative, especially as a function of the circumstances of an accident and/or of passenger parameters, to which end appropriate detection and control devices are provided, preferably with electric or electronic data acquisition, data transfer and data processing. The operation or function of the paring knives is preferably controlled by a final control element or a plurality of final control elements that is/are adjusted by pyrotechnic pressure in a preselected or preselectable manner, thus freeing or blocking the operation/function of individual knives or groups of knives. Such final control elements can be designed in the form of plates with blocking segments that can be rotated in recesses of the knives. Several such final control elements can be connected in series (e.g., double, see FIGS. 3, 4 and 5).

The knives and final control elements can advantageously be housed in or on a piston.

As an alternative to a pyrotechnic control of the engagement of the paring knives, the latter can also be put or held/blocked in their operation by electromagnetic control devices.

The fixing of a piston as a component of the load absorption devices and/or withdrawal devices in its cylinder, which is in turn a component of, for instance, the adjustment shaft of the linear positioning devices in order to assure their function.

A piston can be provided in displaceable tubes of a steering mechanism without the need for a separate cylinder. In this instance, at least a supporting intermediate wall for building up the necessary counterpressure is required in order to adjust load absorption devices (e.g. as above with paring knives) and/or withdrawal devices by pyrotechnology.

The piston can be used to build up pressure pyrotechnically behind it in order to move, e.g., the adjustment shaft of the linear positioning devices in the case of an electrically adjustable steering mechanism or the steering column in the case of a normal steering mechanism to the front away from the driver in an accident (withdrawal devices).

3. Electrically adjustable steering mechanism in two planes (four directions) with only one motor: electrically adjustable steering mechanisms known in current practice are usually adjusted in four directions with two electric transmission motors. Weight, installation space and expense are saved by the invention by achieving the adjustment in four directions with only one appropriately switchable motor.

Other embodiment measures of this aspect of the present invention are:

The motor can be designed and used such that an electrically or mechanically switchable coupling alternatively brings about either the longitudinal adjustment or the adjustment in height of the steering column by means of forward or backward movement.

The longitudinal adjustment can be realized in that a threaded spindle moves a nut attached to the movable steering column or to a movable part of the steering column, and therewith the steering column or the part of the steering column, forward or backward.

The adjustment in height can be realized in that a threaded spindle attacks an articulated lever pair such that, to a greater or lesser extent, the levers are extended toward one another or flexed against one another, and as a result, the interval or the angle between the body and the steering column changes in a desired direction. A design with articulated levers is especially stable when oppositely directed or multiple articulated-lever systems are used.

The design of the adjustment of the steering column, particularly an electrical one, can be such that the longitudinal drive mechanism and the adjustment motor or, more generally, the appropriate linear positioning devices are pivotably attached to the steering column such that the motor and, e.g., the spindle remain at least substantially free of shearing forces. To this end, a motor unit and, if necessary, a transmission unit with position compensation can be provided (see FIG. 1).

The adjustment of height can also be realized with the basic advantages of the invention using a miter-wheel gearing, in which instance the nuts to be used (e.g., running nuts on a spindle) are to be pivotably designed.

BRIEF DESCRIPTION OF THE FIGURES OF THE DRAWING

The invention is described in detail in the following solely by way of example using and referring to the drawings.

DETAILED DESCRIPTION OF PREFERRED EMBODIMENTS OF THE INVENTION

The same reference numerals in the individual figures and illustrations of the drawings designate identical or similar components or components acting identically or similarly. Even features not provided with reference numerals are clear from the representations in the drawings, regardless of whether such features are described in the following or not. On the other hand, features that are contained in the present specification but are not visible or represented in the drawings are readily understandable to a person skilled in the art.

Individual features indicated and/or shown in conjunction with concrete embodiments are not limited to these embodiments or to a combination with the other features of these embodiments but rather can be combined within the framework of what is technically possible with any other variants, even if they are not separately treated in the present specification.

Figure 1:
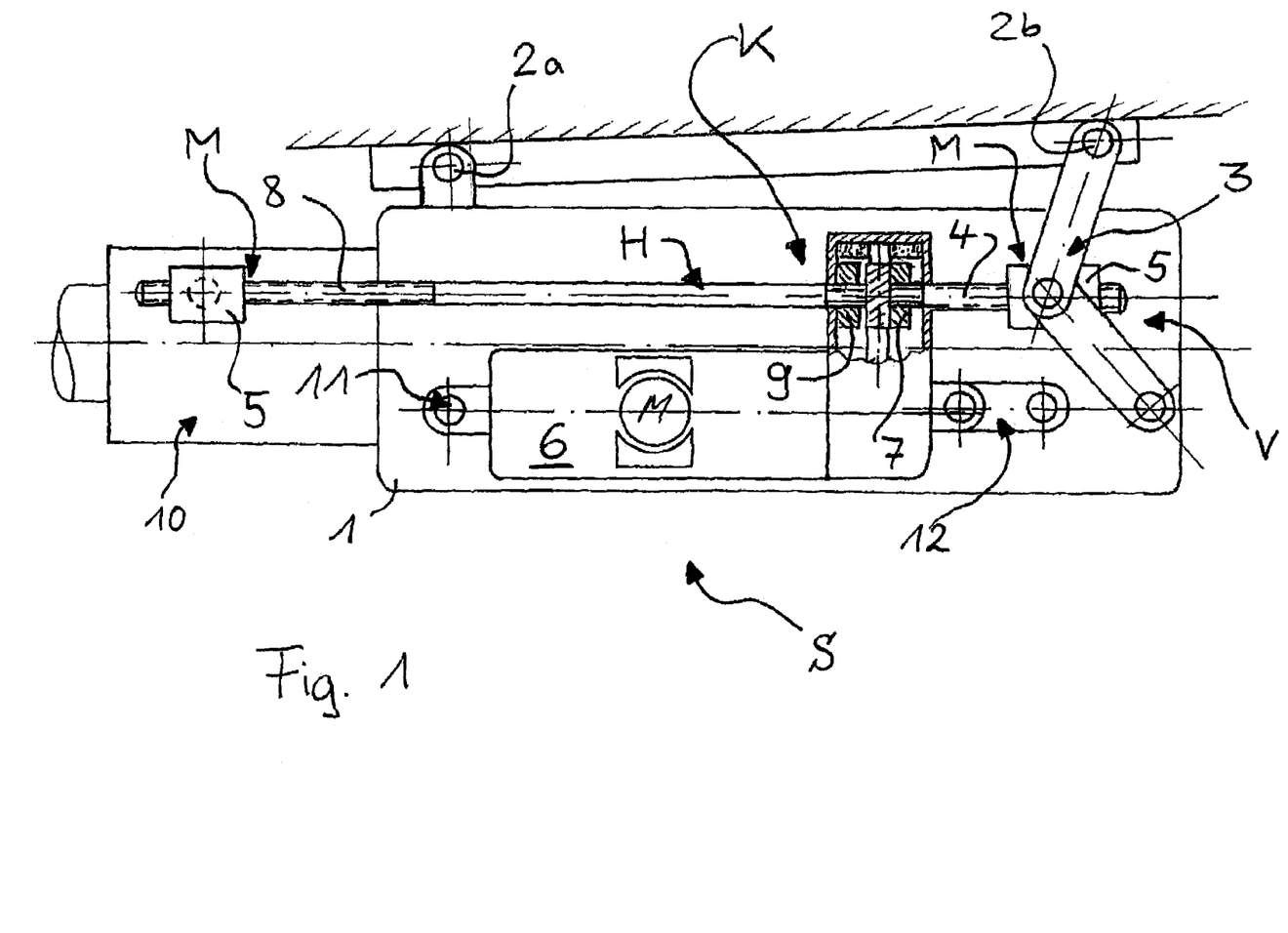
FIG. 1 shows a first embodiment of a safety steering mechanism in section in a cross-sectional view.

FIG. 1 shows a sectional cross section of the suspension of a first embodiment of a safety steering mechanism S of steering mechanism housing 1 of steering column 10 on two suspension points 2a, 2b and two double levers or links as so-called articulated levers 3 that can be varied in length by "flexing." Vertical adjustment threaded spindle 4 shortens articulated levers 3, which pivot apart or together in accordance with the direction of movement of vertical adjustment threaded spindle 4. Links 3 are pivotally fastened on nut 5. Steering housing 1 is pivoted up and down thereby. To this end, vertical adjustment threaded spindle 4 (up/down motion of steering column 10) is driven by adjustment motor 6 connected by vertical adjustment clutch 7 to vertical adjustment threaded spindle 4.

A longitudinal movement of steering column 10 in steering mechanism housing 1 is produced when switching motor 6 to longitudinal adjustment clutch 9 and therewith longitudinal adjustment threaded spindle 8 (back-and-forth motion of steering column 10). In order that the movements do not reciprocally influence one another, adjustment motor 6 should have an articulation point 11 on steering mechanism housing 1 in the longitudinal direction, which articulation point, however, allows pivoting movements. In order to avoid a jamming of threaded spindles 8, 4, position compensator 12 is attached to adjustment motor 6.

Thus, comfort adjustment K comprises vertical adjustment devices V and longitudinal adjustment devices H as components and makes use of linear positioning devices M.

Figure 2:
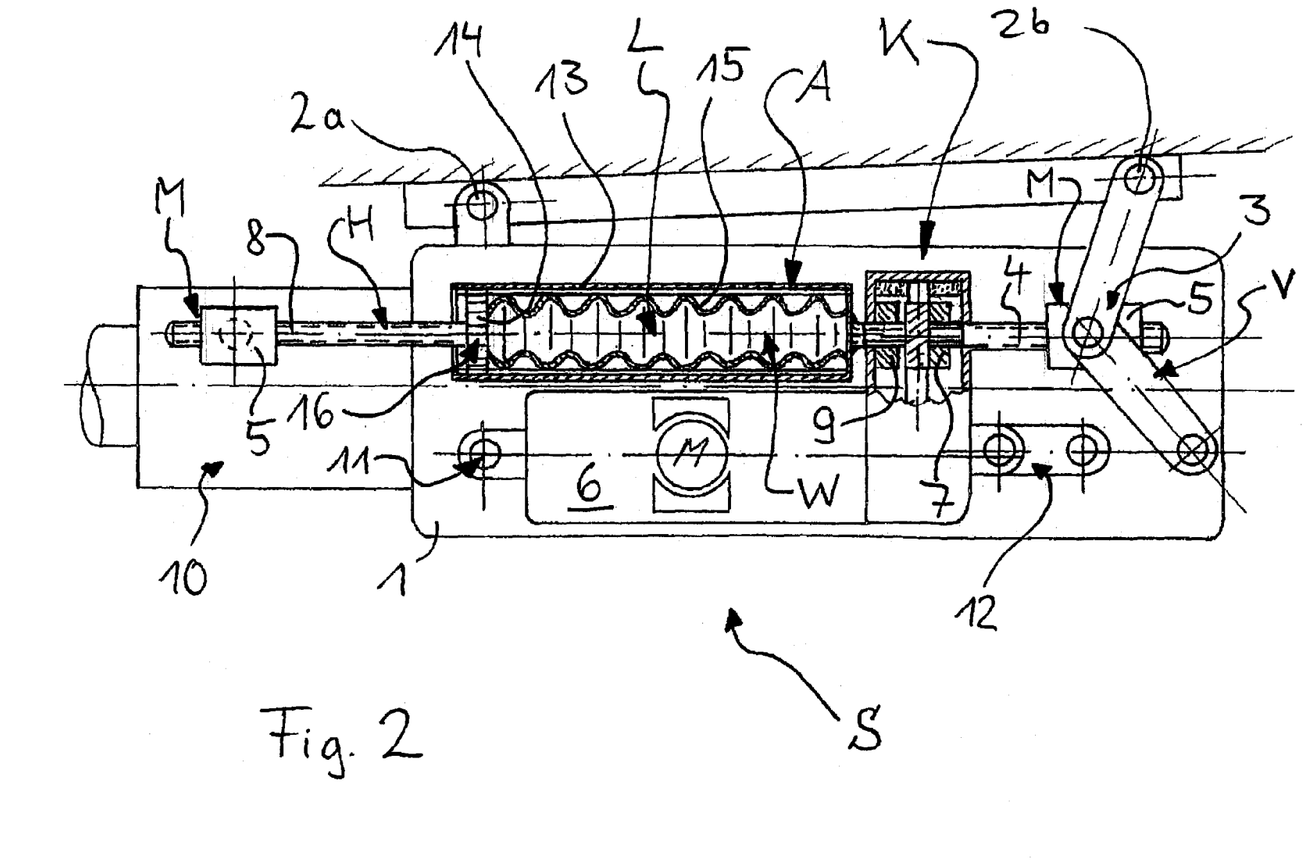
FIG. 2 shows a second embodiment of a safety steering mechanism in section in a cross-sectional view.

Alternatively, as can be seen in FIG. 2, cylinder 13 is built into longitudinal adjustment threaded spindle 8 (back-and-forth motion of steering column 10) in a second embodiment in accordance with the sectional cross section view of FIG. 2. Cylinder 13 is connected at one end to longitudinal adjustment coupling 9 and coupled on the opposite end to piston 14 on longitudinal adjustment threaded spindle 8. Piston 14 and cylinder 13 are suitably provided with teeth or splines 16 such that piston 14 entrains cylinder 13 rotationally, yet a longitudinal displacement is possible in a crash or in an accident situation.

In order to be able to absorb energy for the longitudinal displacement in a crash, a load absorption element is built into or, alternatively, around cylinder 13. Corrugated tube 15 is shown here in cylinder 13. Alternatively, other deforming materials are conceivable here or even a liquid that is pressed through a nozzle. In general, piston 14, cylinder 13 and corrugated tube 15 are components of load absorbing devices L.

Figure 3:
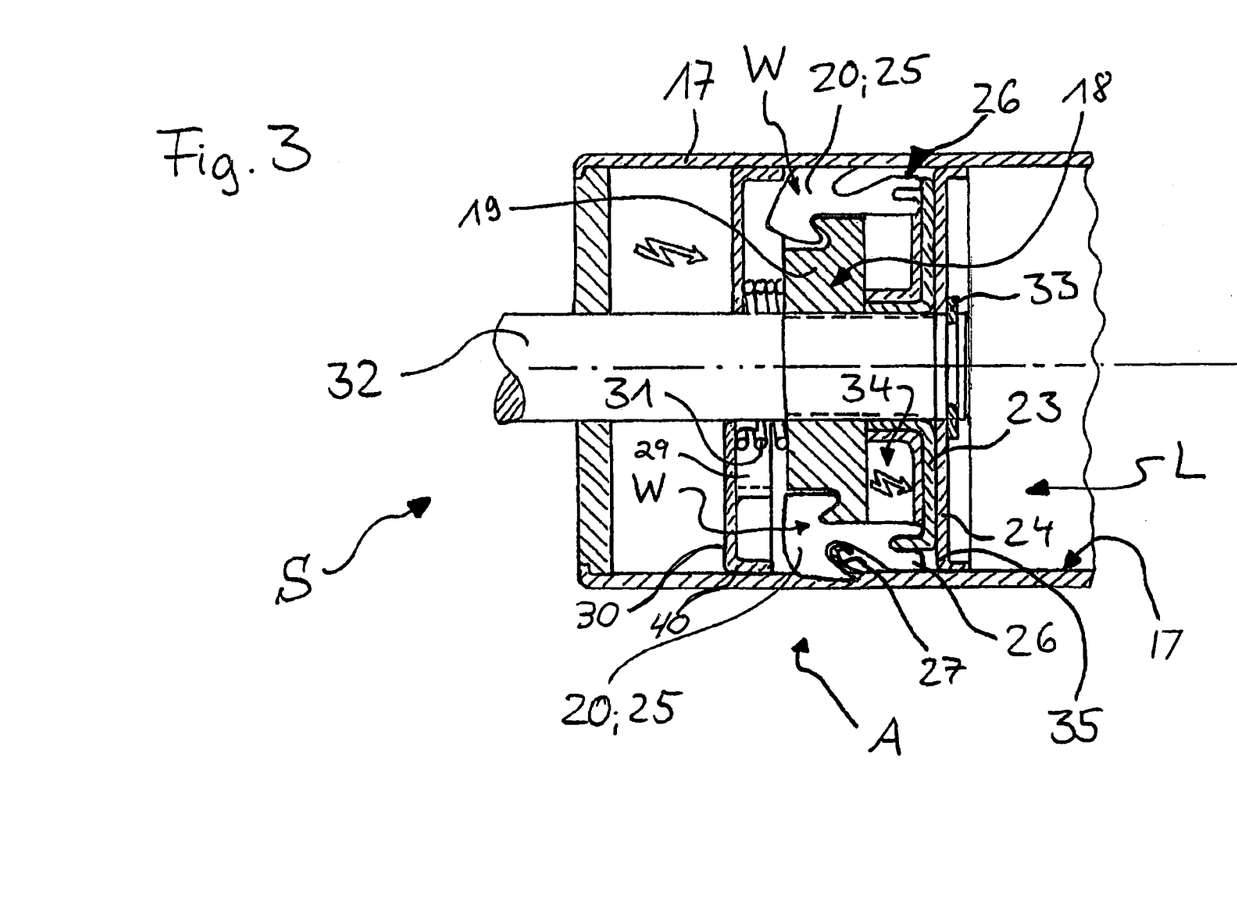
FIG. 3 shows a third embodiment of a safety steering mechanism in section in a cross-sectional view enlarged relative to the views in FIGS. 1 and 2.

FIG. 3 shows a third embodiment of a safety steering mechanism S in a sectional cross section view enlarged in comparison to FIGS. 1 and 2. Cylinder 17 is used here for the absorption of energy in a crash, in which cylinder a piston 18 is shaped as absorption plate 19 such that paring knives 20, 25 are suspended in pairs on opposing sides of its rim. In the example shown, all four paring knives 20, 25, two paring knives 25 or no paring knife can be activated, depending on the requirements of a crash.

If a large person who does not have his seat belt fastened is involved in a crash, four paring knives 20, 25 are required and also used for absorbing energy on account of the high load to be absorbed. To this end, the two pyrotechnic charges 21, 22 and actuating sheet metal parts 23, 24 rotate into paring knives 20, 25 (see FIGS. 4, 5). To this end, actuating sheet metal parts 23, 24 are somewhat twisted. Paring knives 20, 25 are pressed in such a manner against inner wall of cylinder 17 by the pressure of actuating sheet metal parts 23, 24 that they "dig into" the material of this inner wall when piston 18 moves. Pared-off chip 27 is also exactly predetermined as regards its thickness, or, in other words, as regards the depth of the groove produced thereby, by molded-on stop 26 of paring knives 20, 25 and by their width. Pared chip 27 generates a usually desired, uniform absorption of load over the length of its movement. If the load should rise at the end of the movement (e.g., in severe accidents), a deformable element is added at the end, such as corrugated tube 15.

The previously explained components with reference numerals 17 to 27 are components of load absorbing devices L in the present embodiment. Paring knives 20, 25 as well as corrugated tube 15 are components of resistance devices W.

If a greater absorption of load is to be achieved at a higher impact speed, as in a more severe crash, liquid or, more generally, a fluid (e.g., silicone grease is less temperature-dependent) can be used and pressed through a nozzle (not shown). If the material is pressed through more rapidly, greater resistance is produced. A needle passing through the nozzle (not shown) with a changing diameter or a conical form can then be mounted on, for instance, piston 18 and change the load-absorption power in a predetermined manner adapted to the stroke.

In the case of a large person with the seat belt buckled, e.g., only a pair of opposing paring knives 20 or 25 are actuated. Given a different design of the paring knives, logically, two load levels can be actuated, also as a function of the crash impulse, for example. Pressure chambers 34 behind the actuating sheet metal pieces are closed by cover 35 "packed" onto piston rod 32.

Figure 4:
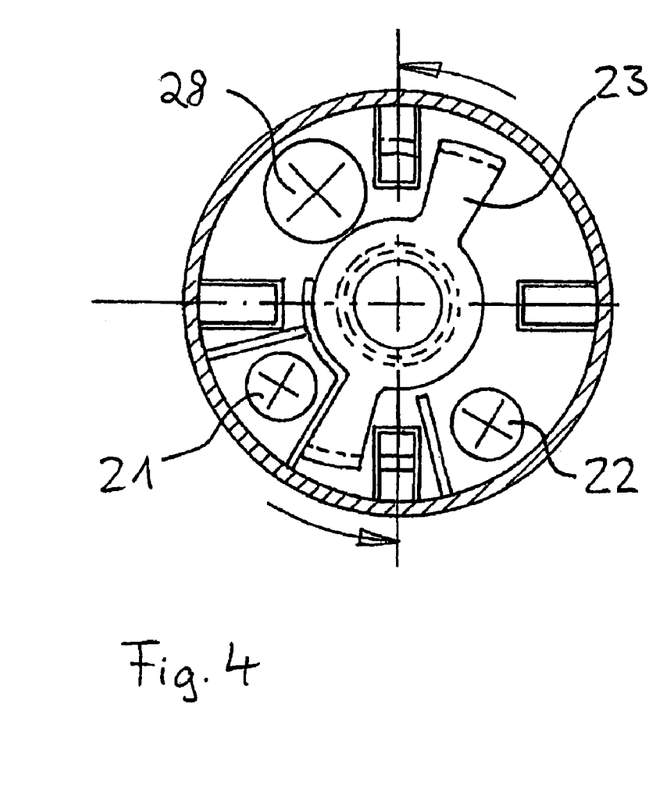
FIG. 4 shows a view of a first detail of the third embodiment in a top view.
Figure 5:
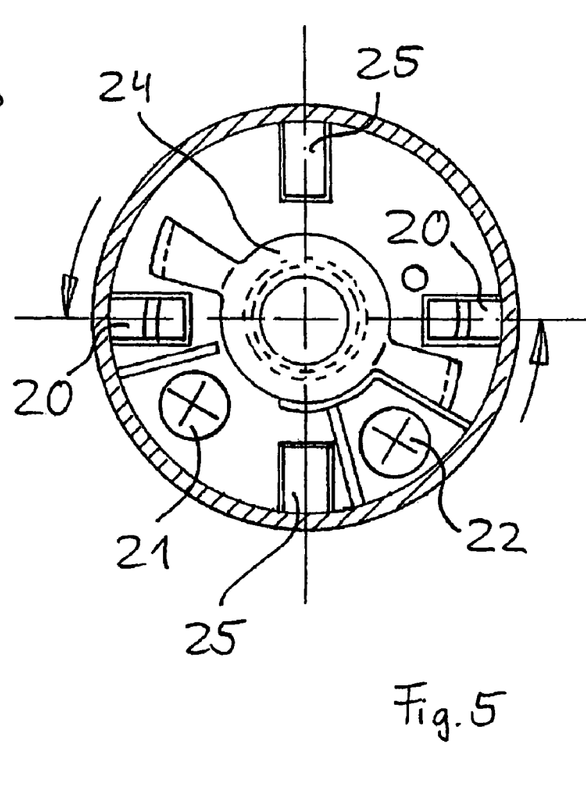
FIG. 5 shows a view of a second detail of the third embodiment in a top view.
Figure 6:
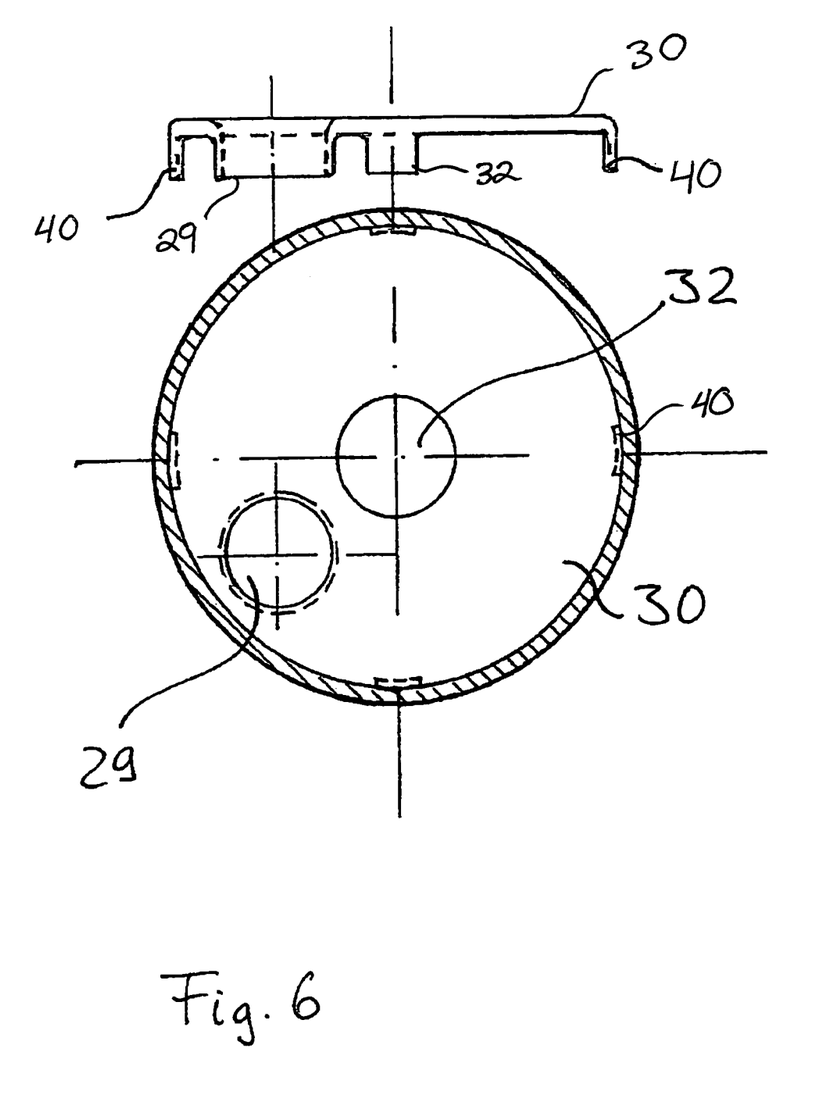
FIG. 6 shows a view of a third detail of the third embodiment in a top view.

Another large pyrotechnic charge 28, positioned according to FIG. 4 in absorption plate 19 (piston 18), applies pressure through passage 29 of the compressed gas in a sheet metal plate onto the top of this pressure plate 30 (see FIG. 6) when a small person is detected who is sitting close to the front of the steering wheel and requires no load absorption. Pressure plate 30 presses paring knives 20, 25 back into their non-paring initial position with its unlocking tabs 40. This design, i.e. moving steering column 10 forward, is based on withdrawal devices R, consisting of the corresponding, previously explained components, and is preferably carried out in every crash in its second phase. The first phase means that the passengers have struck the airbag and the steering mechanism and that the steering mechanism is absorbing a load. In said second phase, the units of the motor vehicle press the front wall and the steering mechanism into the inner space of the motor vehicle. Here, the thrust-forward steering mechanism will oppose a counter movement to this movement. The assembly of absorption plate 19, paring knives 20, 25, actuating sheet metal parts 23, 24 and of pressure plate 30 with its return spring 31 is appropriately fastened on piston rod 32 and secured with, e.g., a lock washer 33. Absorption plate 19 also contains all three pyrotechnic charges 21, 22, 28.

Load absorption devices L and withdrawal devices R are components of safety devices A that assure that at least one end area of the steering column (not shown) can be moved away from a driver's position (not shown) in an accident.

Figure 7:
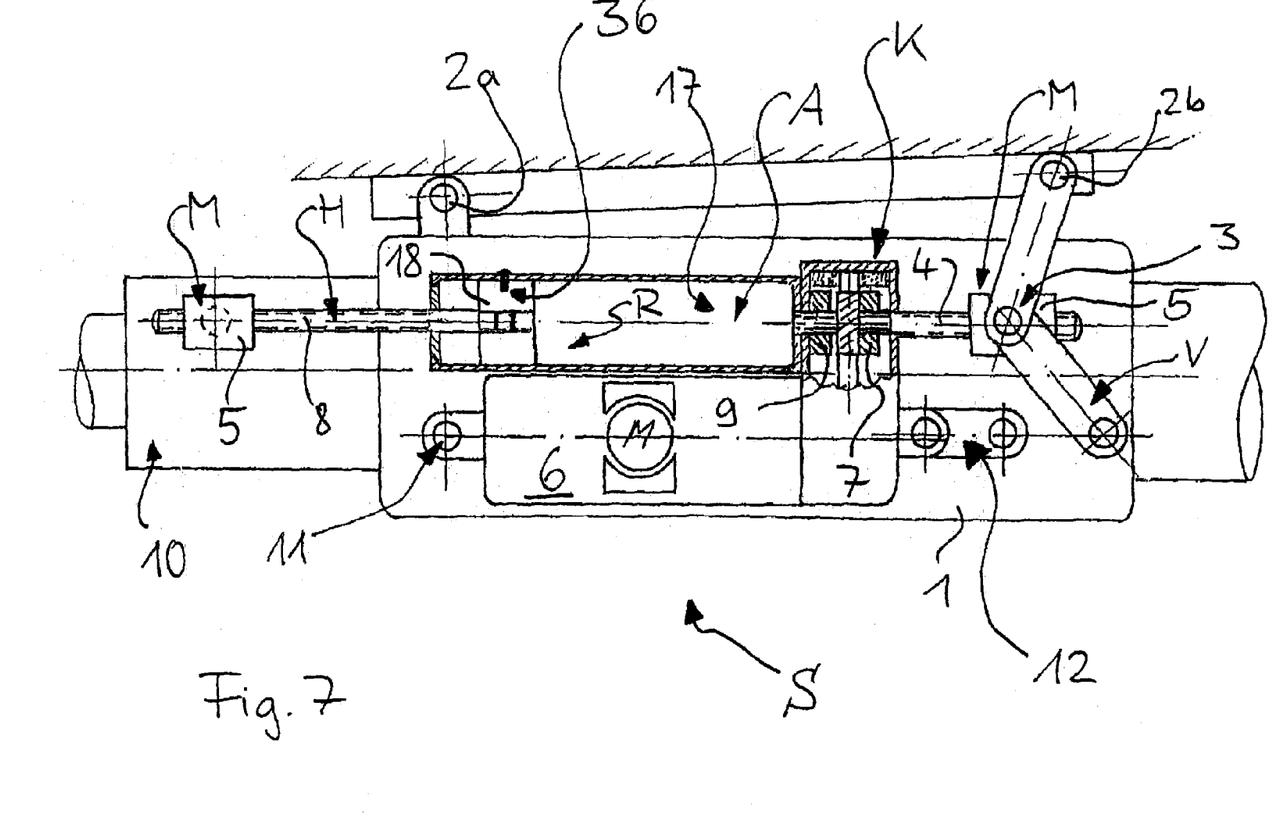
FIG. 7 shows a fourth embodiment of a safety steering mechanism in section in a cross-sectional view.

FIG. 7, within the framework of a fourth embodiment, which is shown in a sectional cross section view and largely agrees with the third embodiment shown and described, so that an explanation of the same or similar components is omitted, illustrates that piston 18 is connected to cylinder 17 via tear-off rivets or tear-off pins 36 if cylinder 17 is part of longitudinal adjustment threaded spindle 8 in order to guarantee usage during a comfort adjustment.

Of course, such a "load absorption cylinder" can also be used between the steering mechanism and the steering column in mechanically adjustable steering mechanisms. During the adjustment of the steering mechanism, the "piston" with all attachments moves "empty" in the cylinder.

The invention is very useful for future crash requirements in the steering mechanism at a low cost.

The invention is presented only by way of example using the embodiments in the specification and in the drawings and is not limited to them but rather comprises all variations, modifications, substitutions and combinations that a person skilled in the art can gather from the present documents, especially from the claims and the general presentations in the introduction to this specification as well as from the description of the embodiments and their representations in the drawings, which he can combine with his professional knowledge and the state of the art, especially with the inclusion of the complete disclosures of the older applications indicated at the beginning of this specification. In particular, all individual features and possibilities of configuring the invention and its embodiments can be combined, or also used and protected individually.

The invention claimed is:

1. A safety steering column for protecting a driver in an accident, comprising:
   a comfort adjustment device including vertical and longitudinal adjustment devices and a safety load absorption device;
   a drive system including a motor and a transmission operably connected to the comfort adjustment device to selectively, independently, drive the vertical and longitudinal adjustment devices, wherein the motor is a common drive motor to the vertical and longitudinal adjustment devices; and
   a withdrawal device which moves the safety steering column away from the driver.

2. A safety steering column as set forth in claim 1 wherein the vertical adjustment device includes a vertical adjustment threaded spindle and the longitudinal adjustment device includes a longitudinal adjustment threaded spindle, the vertical and longitudinal adjustment threaded spindles linearly positioned along a longitudinal axis of the comfort adjustment device.

3. A safety steering column as set forth in claim 2 wherein the vertical and longitudinal adjustment threaded spindles are operably connected to the transmission, such that the transmission can selective rotate the vertical and longitudinal adjustment threaded spindles.

4. A safety steering column as set forth in claim 3 wherein the transmission comprises a longitudinal spindle clutch operable connected to the longitudinal adjustment threaded spindle and vertical spindle clutch operable connected to the vertical adjustment threaded spindle, such that the longitudinal and vertical spindle clutches can be operated to selectively rotate the longitudinal and vertical adjustment threaded spindles.

5. A safety steering column as set forth in claim 2 wherein the vertical adjustment device comprises a pair of articulating levers connected in a scissors arrangement and coupled to the vertical adjustment threaded spindle such that the pair of articulating levers adjust a vertical position of the safety steering column as the vertical adjustment threaded spindle is rotated.

6. A safety steering column as set forth in claim 3 wherein the longitudinal adjustment threaded spindle includes the safety load absorption device.

7. A safety steering column as set forth in claim 6 wherein the safety load absorption device comprises:
   a cylinder; and
   a piston slidably positioned through the cylinder.

8. A safety steering column as set forth in claim 7 wherein the safety load absorption device further comprises a corrugated tube.

9. A safety steering column as set forth in claim 7 wherein an outer surface of the piston engages an inner surface of the cylinder, such that the piston and cylinder rotate about the longitudinal axis of the comfort adjustment device as the longitudinal adjustment threaded spindle is rotated.

10. A safety steering column as set forth in claim 7 wherein the piston includes an absorption plate including paring knives.

11. A safety steering column as set forth in claim 7 wherein the withdrawal device is integrated into the safety load absorption device, such that the withdrawal device can be activated to move the piston relative to the cylinder along the longitudinal axis of the comfort adjustment device.

12. A safety steering column as set forth in claim 1 wherein the safety load absorption device absorbs an impact of a driver on the safety steering column in a first stage of the accident.

13. A safety steering column as set forth in claim 12 wherein the withdrawal device moves the safety steering column away from the driver in a second stage of the accident.

* * * * *